United States Patent
Nakajima et al.

(10) Patent No.: US 9,187,035 B2
(45) Date of Patent: Nov. 17, 2015

(54) VEHICLE WARNING SOUND EMITTING APPARATUS

(75) Inventors: Yuki Nakajima, Yokohama (JP); Keisuke Suzuki, Fujisawa (JP); Naoki Ueda, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 446 days.

(21) Appl. No.: 13/641,619

(22) PCT Filed: May 23, 2011

(86) PCT No.: PCT/IB2011/001110
§ 371 (c)(1),
(2), (4) Date: Oct. 16, 2012

(87) PCT Pub. No.: WO2011/148246
PCT Pub. Date: Dec. 1, 2011

(65) Prior Publication Data
US 2013/0033374 A1 Feb. 7, 2013

(30) Foreign Application Priority Data

May 24, 2010 (JP) .................................. 2010-118517

(51) Int. Cl.
*B60Q 1/54* (2006.01)
*B60Q 5/00* (2006.01)
(Continued)

(52) U.S. Cl.
CPC ............... *B60Q 5/008* (2013.01); *B60W 10/06* (2013.01); *B60W 20/00* (2013.01)

(58) Field of Classification Search
CPC ............... B60Q 1/54; B60Q 1/44; G01P 1/11
USPC .............. 340/425.5, 426.23, 426.3, 466, 467; 180/170, 338, 423; 968/507, 412
See application file for complete search history.

(56) References Cited

U.S. PATENT DOCUMENTS

2005/0200462 A1  9/2005  Maekawa et al.
2007/0257783 A1* 11/2007  Matsumoto et al. ....... 340/425.5
(Continued)

FOREIGN PATENT DOCUMENTS

AT    507485 A2    5/2010
CN    101107151 A  1/2008
(Continued)

OTHER PUBLICATIONS

An English translation of the Japanese Office Action for the corresponding Japanese patent application No. 2010-118517 issued on Jan. 28, 2014.
An English translation of the Chinese Office Action for the corresponding Chinese patent application No. 201180023703.0 issued on Oct. 10, 2014.

*Primary Examiner* — George Bugg
*Assistant Examiner* — Anthony D Afrifa-Kyei
(74) *Attorney, Agent, or Firm* — Global IP Counselors, LLP

(57) ABSTRACT

A vehicle warning sound emitting apparatus includes a warning sound emitting component and a controller. The warning sound emitting component selectively emits a warning sound that is audible outside of the vehicle. The controller controls the warning sound emitting component to emit the warning sound during a prescribed period that an engine sound is being emitted from an engine of the vehicle such that the engine sound and the warning sound are audible at a location outside the vehicle during the prescribed period when the controller is controlling the warning sound emitting component to switch between emitting the warning sound and refraining from emitting the warning sound based on a vehicle traveling condition.

8 Claims, 6 Drawing Sheets

(51) Int. Cl.
   *B60W 10/06* (2006.01)
   *B60W 20/00* (2006.01)

(56) References Cited

U.S. PATENT DOCUMENTS

2010/0245069 A1* 9/2010 Noro .............................. 340/441
2011/0199199 A1* 8/2011 Perkins ......................... 340/435
2012/0323439 A1* 12/2012 Inakazu et al. .................. 701/36

FOREIGN PATENT DOCUMENTS

| JP | 07-322403 | 8/1995 |
| JP | 10-083187 A | 3/1998 |
| JP | 3149916 B2 | 1/2001 |

* cited by examiner

VEHICLE WARNING SOUND EMITTING APPARATUS

CROSS-REFERENCE TO RELATED APPLICATIONS

This application is a U.S. National stage of International Application No. PCT/IB2011/001110, filed May 23, 2011. This application claims priority to Japanese Patent Application No. 2010-118517, filed on May 24, 2010. The entire disclosure of Japanese Patent Application No. 2010-118517 is hereby incorporated herein by reference.

BACKGROUND

1. Field of the Invention

The present invention relates to a vehicle warning sound emitting apparatus. More particularly, the present invention relates to a vehicle warning sound emitting apparatus that emits sounds pertaining to conditions of the electric vehicle.

2. Background Information

Certain electrically powered vehicles, hybrid vehicles powered by an electrical motor and combustion engine, and even conventional combustion engine vehicles can be constructed to operate very quietly. For example, the gear shifting operations, forward and reverse movement and other operating conditions of such vehicles may be quieter than in typical combustion engine vehicles. These quieter vehicles may not be as readily detectable by pedestrians as are typical combustion engine vehicles. Therefore, these types of vehicles may be equipped with a warning device that emits sound externally of the vehicle.

For example, Japanese Laid-open Patent Publication No. 07-322403 describes a warning sound emitting apparatus that operates to emit a warning sound toward a person in a surrounding area outside of a vehicle. The warning sound emitting apparatus can include, for example, a speaker, a buzzer or any other warning sound emitting source that can emit a warning sound to a person in a surrounding area outside of the vehicle.

SUMMARY

However, in a hybrid vehicle that includes a combustion engine and an electric motor, or in an electric vehicle that includes an electric power generator, it may not be necessary to operate a warming sound emission device to emit a warning sound from the vehicle when the engine is running. That is, because the engine emits a sound, this sound can serve as a warning sound to people outside of the vehicle.

Accordingly, if an engine sound that can serve as a warning sound is being emitted, the warning sound emitting apparatus can be controlled to refrain from emitting a warning sound. However, if such an engine sound is not being emitted, then the warning sound generating apparatus can be controlled to generate a warning sound.

The system described in Japanese Laid-Open Patent Publication No. 07-322403 fails to include features for controlling a warning sound emitting apparatus to be in an inactive state and refrain from emitting a warning sound when an engine sound that can suitably act as a warning sound is being emitted. Instead, when the vehicle changes from a state in which an engine sound that can serve as a warning sound is not emitted to a state in which an engine sound that can serve as a warning sound is being emitted, the warning sound emitting apparatus is switched from an operating state to a non-operating state. Accordingly, the warning sound being emitted by the warning sound emitting apparatus is silenced. Conversely, when the vehicle changes from a state in which an engine sound that can serve as a warning sound is emitted to a state in which an engine sound that can serve as a warning sound stops being emitted, the warning sound emitting apparatus is switched from an non-operating state to an operating state. Hence, the warning sound emitting apparatus is operated to emit a warning sound.

However, with this type of switching control, the switching between an engine sound and a warning sound occurs abruptly. Therefore, a person outside the vehicle may find it is more difficult to ascertain conditions pertaining to the vehicle, such as vehicle position, vehicle traveling direction, vehicle traveling speed and so on. Thus, the person may become confused by the sounds being emitted from the vehicle. For example, the person may inadvertently perceive that the vehicle has temporarily moved farther away or closer to the person.

Accordingly, an object of the present invention is to provide a vehicle warning sound emitting apparatus that can resolve or at least reduce the problem explained above by preventing an abrupt switch between an engine sound and a warning sound.

In view of the state of the known technology, a vehicle warning sound emitting apparatus basically comprises a warning sound emitting component and a controller. The warning sound emitting component is configured to selectively emit a warning sound that is audible outside of the vehicle. The controller is configured to control the warning sound emitting component to emit the warning sound during a prescribed period that an engine sound is being emitted from an engine of the vehicle such that the engine sound and the warning sound are audible at a location outside the vehicle during the prescribed period when the controller is controlling the warning sound emitting component to switch between emitting the warning sound and refraining from emitting the warning sound based on a vehicle traveling condition.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
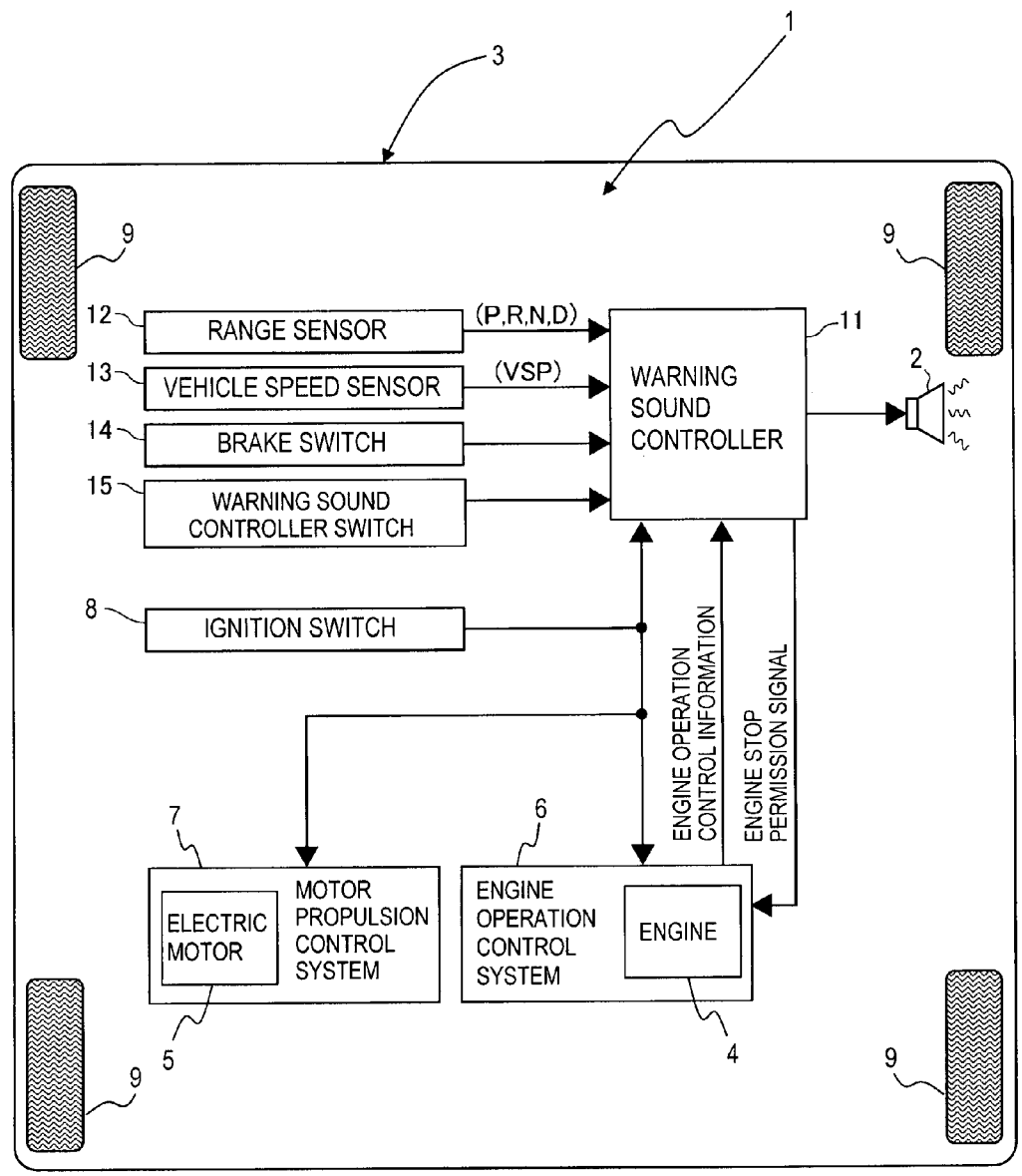
FIG. 1 is a control system diagram diagrammatically illustrating a vehicle warning sound emitting apparatus according to a disclosed embodiment.

Referring initially to FIG. 1, a vehicle warning sound emitting apparatus 1 is illustrated in accordance with a disclosed embodiment. More specifically, FIG. 1 is a control system diagram showing an example of components of a control system of the vehicle warning sound emitting apparatus 1 for controlling a vehicle exterior speaker 2 that can serve as a warning sound emitting source.

In this embodiment, the vehicle 3 in which the warning sound emitting apparatus 1 is employed is a hybrid vehicle having an engine 4 and an electric motor 5 that propel the vehicle 3. However, the vehicle 3 can instead be an electric powered vehicle equipped with an electric power generator as understood in the art. Either type of vehicle 3 is propelled by operating an electric motor 5 alone when the vehicle 3 is traveling at a low speed with a small load, and is propelled by operating an engine 4 regardless of the vehicle speed when the load is large. Naturally, the vehicle 3 can be a car, truck, van, SUV or any other suitable type of vehicle. Also, the vehicle 3 need not be a hybrid vehicle or an electric powered vehicle, but rather, can be a conventional combustion engine vehicle or a vehicle having any combination of a combustion engine and electronic motor.

In this example, an engine operation control system 6 controls the engine 4 in a manner as understood in the art. Also, in this example, a motor propulsion control system 7 controls the electric motor 5 in a manner as understood in the art. The control systems 6 and 7 are both assumed to be in an on-state while an ignition switch 8 operated by, for example, a driver is turned on.

While the motor propulsion control system 7 is in an on-state, the motor propulsion control system 7 drives the electric motor 5 to propel the vehicle when an operating condition of the electric motor 5 is satisfied. More specifically, when a brake pedal (not shown) is released and an accelerator pedal (not shown) is depressed, the motor propulsion control system 7 drives the electric motor 5 in a rotational direction corresponding to a driving operation performed the driver and with a torque corresponding to the driving operation. The motor torque is transmitted to one or more wheels 9 of the vehicle 3 by, for example, a drive mechanism or any other suitable mechanism known in the art, to propel the vehicle 3.

While the engine operation control system 6 is in an on-state, the engine operation control system 6 drives the engine 4 so as to operate an electric generator (not shown) or propel the vehicle 3 when an operating condition of the engine 4 is satisfied. More specifically, when an accelerator pedal is depressed deeply during, for example, high load driving, the engine operation control system 6 drives the engine 4 to, for example, operate the electric generator and charge a battery (not shown). The battery can serve as a power source for the electric motor 5 in, for example, an electric powered vehicle equipped with an electric power generator. Naturally, the engine operation control system 6 can drive the engine 4 to transmit the engine torque to a wheel 9 of the vehicle 3 via, for example, a drive mechanism, to propel the vehicle 3.

As further shown in FIG. 1 and described herein, the vehicle exterior speaker 2 operates as a warning sound emitting component configured to selectively emit a warning sound that is audible outside of the vehicle 3. The vehicle exterior speaker 2 is controlled by a warning sound controller 11. The warning sound controller 11 receives a signal from a range sensor 12 that operates to detect if a shift mechanism is set to Park (P), Reverse (R), Neutral (N), or Drive (D) in response to a shifting operation (e.g., a range selection) performed by a driver in order to park the vehicle 3 or designate a movement direction for the vehicle 3.

The warning sound controller 11 also receives a signal from a vehicle speed sensor 13 that operates to detect a vehicle speed VSP. The warning sound controller 11 further receives a signal from a brake switch 14 that turns on when the brake pedal is depressed and braking state exists, and turns off when the brake pedal is released and a non-braking state exists. In addition, the warning sound controller 11 receives a signal from a warning sound controller switch 15 that can be operated by, for example, a driver. The warning sound controller switch 15 can be set to a first condition to instruct the warning sound controller 11 to execute on-off control with respect to the vehicle exterior speaker 2, or to a second condition to instruct the warning sound controller 11 to maintain the vehicle exterior speaker 2 in a non-operating state so that a warning sound is not emitted. Furthermore, the warning sound controller 11 receives a signal from the ignition switch 8 that, for example, indicates that the engine operation control system 6 and the motor propulsion control system 7 have been turned on.

It should also be noted that the engine operation control system 6, the motor propulsion control system 7, and warning sound controller 11 shown in FIG. 1 can each include, for example, a microcomputer with a control program that controls and interacts with the components of the vehicle 3 as discussed herein. The engine operation control system 6, the motor propulsion control system 7, the warning sound controller 11, and any other controller discussed herein can also each include other conventional components such as an input interface circuit, an output interface circuit, and storage devices such as a ROM (Read Only Memory) device and a RAM (Random Access Memory) device. The RAM and ROM store processing results and control programs that are run by the engine operation control system 6, the motor propulsion control system 7, and warning sound controller 11. The engine operation control system 6, the motor propulsion control system 7, and warning sound controller 11 and any other controller discussed herein are operatively coupled to the components of the vehicle 3 in a conventional manner. It will be apparent to those skilled in the art from this disclosure that the precise structure and algorithms for the engine operation control system 6, the motor propulsion control system 7, and warning sound controller 11 and any other controller discussed herein can be any combination of hardware and software that will carry out the functions of the embodiments discussed herein.

As will now be described, the warning sound controller 11 executes a control program as shown, for example, in FIG. 2 repeatedly once every prescribed time period, such as every 10 msec or at any other suitable interval, with a regular interrupt while the ignition switch 8 is in an on-state. The program serves to operate the warning sound controller 11 to control emission of a warning via, for example, the vehicle exterior speaker 2 that can be received by a person existing in a surrounding area outside the vehicle 3. The warning can convey vehicle information indicating, for example, the existence of the vehicle 3, as well as a shift operation, a brake operation, or other operation indicating an intent of a driver. The warning can also convey information pertaining to, for example, the travel direction of the vehicle 3, as well as vehicle speed and other traveling conditions.

Figure 2:
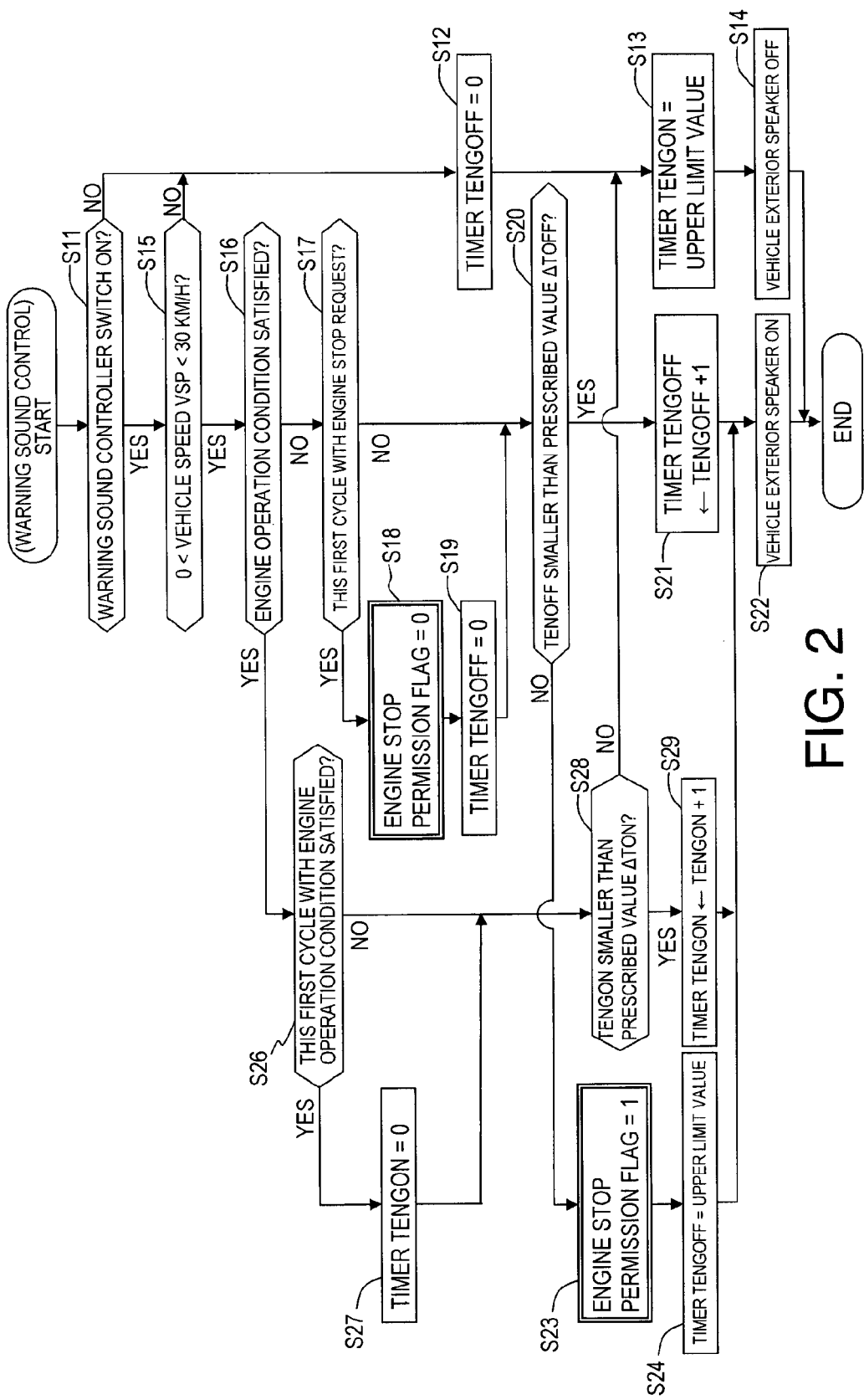
FIG. 2 is a flowchart showing an example of a warning sound control program executed by a warning sound controller shown in FIG. 1.

Turning now to FIG. 2, in step S11, the warning sound controller 11 determines if the warning controller switch 15 is on or off to determine if the driver desires the warning sound controller 11 to execute on-off control of the vehicle exterior speaker 2. If the warning sound controller switch 15 is not on, then the driver does not wish for the vehicle exterior speaker 2 to emit a warning sound. For example, the driver may not want for the vehicle 3 to emit a warning sound because the driver is driving in a residential area. Thus, the processing performed by warning sound controller 11 proceeds to steps S12, S13 and S14 as indicated.

In step S12, an engine-off timer TENGOFF used for the on-off control of the vehicle exterior speaker 2 is reset to 0. That is, the engine-off timer TENGOFF is used to measure an amount of time that has elapsed since an engine stop request occurred with respect to the engine 4.

In step S13, an engine-on timer TENGON used for the on-off control of the vehicle exterior speaker 2 is reset to an upper limit value. As discussed in more detail below, the engine-on timer TENGON is reset to 0 when the engine 4 is started and serves to measure an amount of time elapsed since the engine 4 was last started. In step S14, the warning sound controller 11 turns the vehicle exterior speaker 2 off to prohibit emission of a warning sound, thereby complying with the driver's desire that a warning sound should not be emitted from the vehicle exterior speaker 2.

On the contrary, if the warning sound controller 11 determines in step S11 that the driver has turned the warning sound controller switch 15 on and thus desires for a warning sound to be emitted from the vehicle exterior speaker 2, then the processing continues to step S15. Accordingly, on-off control of the vehicle exterior speaker 2 is performed as will now be explained.

That is, the warning sound controller 11 turns on the vehicle exterior speaker 2 and a warning sound is emitted basically during a period when the vehicle speed VSP is below 30 km/h. This warning sound emission is indicated in the period from time t1 to time t4 in the time chart shown in section (a) of FIG. 3 and in the period from time t5 to time t8 in the time chart shown in section (b) of FIG. 3. The period from time t1 to time t4 corresponds to a period of acceleration of the vehicle 3 from a stopped state. The period from time t5 to time t8 in the time chart shown in section (b) of FIG. 3 corresponds to period of deceleration of the vehicle 3 to a stop. The warning sound generally need not be emitted from the vehicle exterior speaker 2 when the vehicle speed VSP is at or about 30 km/h or higher, which indicates that the vehicle 3 is traveling in a suburban area or other area where a warning sound is not actually necessary. Also, the warning sound can be, for example, a pseudo engine sound resembling the engine sound, a driver or passenger in the vehicle 3, such as an electric or hybrid vehicle, that is capable of quiet travel will not be able to enjoy quiet travel if the pseudo engine sound is emitted continuously while the vehicle 3 is traveling on, for example, the highway or rural roads.

Thus, the vehicle exterior speaker 2 is turned on and a warning sound is emitted during the periods when the vehicle speed VSP is at or below 30 km/h, which is indicated by the period between times t1 and t4 in section (a) of FIG. 3 and the period between times t5 and t8 in section (b) of FIG. 3. Also, the vehicle exterior speaker 2 can be turned off so that a warning sound is not emitted during periods when the vehicle speed VSP is at or about 30 km/h or higher. These periods correspond, for example, to a period occurring after the time t4 in section (a) of FIG. 3 and to a period occurring prior to time t5 in section (b) of FIG. 3. The vehicle exterior speaker 2 can also be turned off during periods when the vehicle speed VSP is at or about 0 km/h and the vehicle 3 is stopped in a state in which a preparation for acceleration is not complete. These periods correspond to a period occurring before time t1 in section (a) of FIG. 3 and to a period occurring after time t8 in section (b) of FIG. 3.

Figure 3:
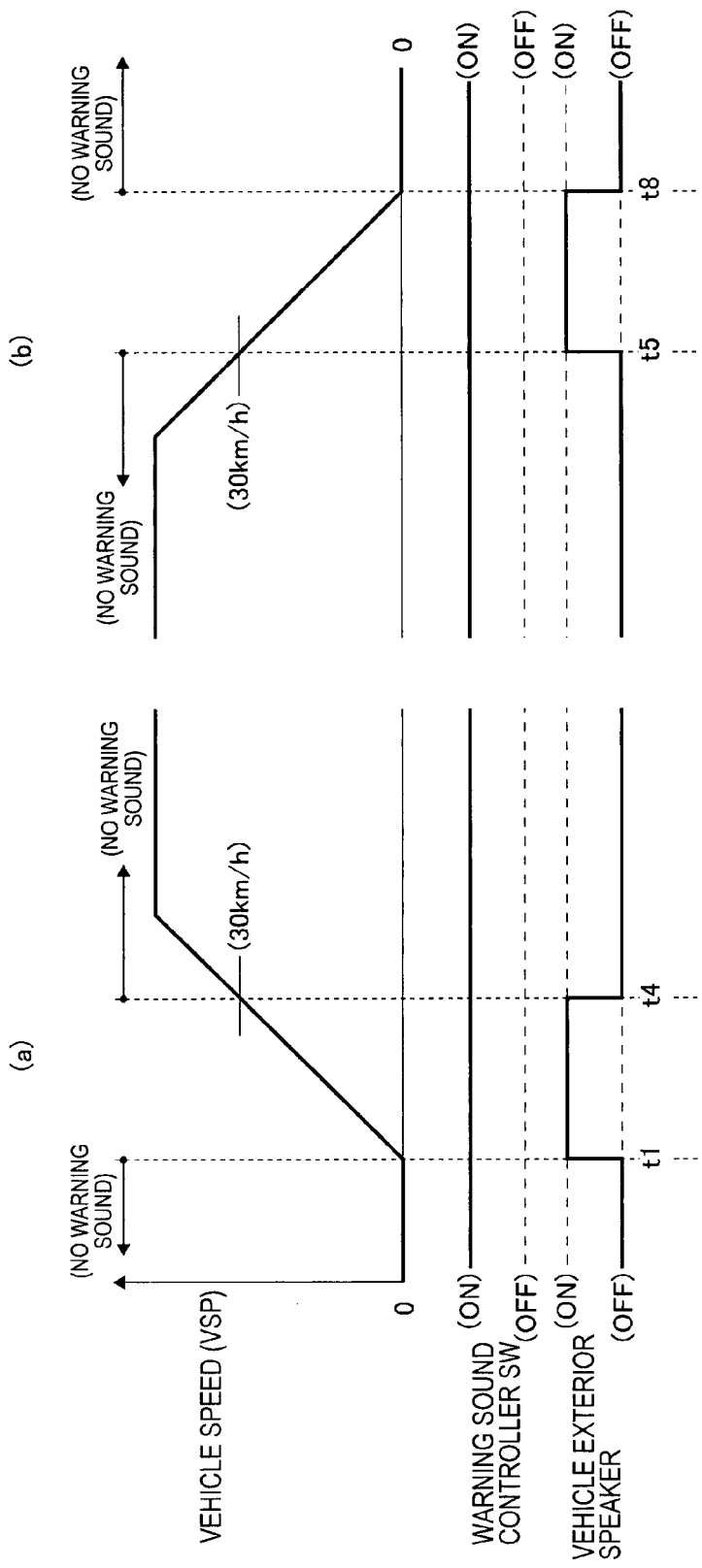
FIG. 3 is an exemplary operation time chart for the warning sound control program shown in FIG. 2, with section (a) of the time chart corresponding to a situation in which the vehicle is accelerated from a stopped state without the engine being started and section (b) of the time chart corresponding to a situation in which the vehicle is decelerated to a stop without the engine being stopped.

Also, at time t1 in section (a) of FIG. 3, it is generally not desirable for the warning sound to be emitted only after the vehicle 3 has started in motion. Thus, even if the vehicle speed VSP is still 0 km/h, it is preferable to determine that the acceleration preparation is completed when the brake switch 14 turns off due to the brake pedal being released. When this occurs, the vehicle exterior speaker 2 can be turned on to emit a warning sound. Furthermore, at the time t8 shown in section (b) of FIG. 3, it is generally not desirable f for the warning sound to be silenced immediately when the vehicle stops. Thus, even after the vehicle speed VSP reaches 0 km/h, it is preferable to continue with the vehicle exterior speaker 2 on for a set period of time before turning the vehicle exterior speaker 2 off and silencing the warning sound. This period of time can be, for example, approximately 10 seconds or any other suitable time period.

In order to achieve the basic on-off control of the warning sound explained above with regard to FIG. 3, the warning sound controller 11 determines in step S15 if the vehicle speed VSP is between 0 km/h and 30 km/h. If the vehicle speed VSP is not between 0 km/h and 30 km/h, then the warning sound controller 11 executes step S12, step S13 and step S14 in sequence to turn the vehicle exterior speaker 2 off and prohibit the emission of a warning sound as discussed above.

However, if the warning sound controller 11 determines in step S15 that the vehicle speed VS is between 0 km/h and 30 km/h (i.e., greater than 0 km/h and less than 30 km/hr). If so, the warning sound controller 11 proceeds to step S16 and executes an on-off control of the vehicle exterior speaker 2 in accordance with an operating state of the engine 4 as discussed herein. That is, in step S16, the warning sound controller 11 determines if an engine operation condition is satisfied based on, for example, engine operation control information provided to the warning sound controller 11 from the engine operation control system 6 shown in FIG. 1. When the engine operation condition is satisfied, the engine operation control system 6 can immediately or at least promptly start the engine 4 and achieve a state in which the engine is running as discussed in more detail below.

However, if the warning sound controller 11 determines in step S16 that the engine operation condition is not satisfied (e.g., the engine 4 is stopped), the warning sound controller 11 proceeds to step S17. In step S17, the warning sound controller 11 determines if it is the first cycle of the processing since the engine operation condition fails to be satisfied (e.g., since a request to stop the engine 4 was issued). If it is the first cycle, then the warning sound controller 11 processing continues to steps S18 and S19. In step S18, the warning sound controller 11 sets an engine stop permission flag to 0. In step S19, the warning sound controller 11 resets the engine-off timer TENGOFF to 0. The warning sound controller 11 then proceeds to step S20. Also, if it is not the first cycle in which the engine operation condition was not satisfied, the warning sound controller 11 skips steps S18 and S19 and goes directly to step S20.

The engine stop permission flag set in step S18 indicates whether or not an engine stop permission signal will be sent from the warning sound controller 11 to the engine operation control system 6 shown in FIG. 1. When the engine stop permission flag has a value of 0, the warning sound controller 11 does not send an engine stop permission signal to the engine operation control system 6. Accordingly, the engine operation control system 6 does not execute a request to stop the engine 4 in response to a change from a state in which the engine operation condition is satisfied to a state in which the engine operation condition is not satisfied. Instead, the engine stop request is ignored, and the engine 4 is allowed to continue running.

In step S20, the warning sound controller 11 determines if the engine-off timer TENGOFF (which was reset to 0 in step S19) is smaller than a prescribed value ΔTOFF. Initially, the value of TENGOFF is smaller than the prescribed value ΔTOFF because the value is 0 (TENGOFF=0). Accordingly, the warning sound controller 11 processing continues to step S21.

In step S21, the warning sound controller 11 increases the engine-off timer TENGOFF incrementally in, for example, a step-like fashion or in any other suitable manner. Thus, the engine-off timer TENGOFF serves to measure the amount of time that has elapsed since the engine operation condition was determined not to be satisfied (e.g., since a request to stop the engine 4 was issued). In step S22, the warning sound controller 11 turns the vehicle exterior speaker 2 on to emit a warning sound. The processing can then end as indicated.

It should be noted that in step S20, the determining of whether the engine-off timer TENGOFF is smaller than the prescribed value ΔTOFF is equivalent to determining if a prescribed amount of time ΔTOFF has not yet elapsed since the engine operation condition was determined not to be satisfied (e.g., since a request to stop the engine 4 was issued). On the other hand, if it is determined in step S20 that the engine-off timer TENGOFF is equal to or larger than the prescribed value ΔTOFF, this indicates, for example, that a prescribed amount of time ΔTOFF has elapsed since the engine operation condition ceased to be satisfied (i.e., since a request to stop the engine 4 was issued). Accordingly, the processing performed by the warning sound controller 11 continues to step S23.

In step S23 the warning sound controller 11 sets the engine stop permission flag to 1. In step S24 the warning sound controller 11 sets the engine-off timer TENGOFF to an upper limit value. The processing then continues to step S22 as indicted. In step S22 the warning sound controller 11 continues emitting the warning sound by keeping the vehicle exterior speaker 2 on as discussed above. Thus, the warning sound emission control is performed as discussed above with regard to FIG. 3.

Furthermore, it should be noted that when the engine stop permission flag is set to 1 in step S23, the warning sound controller 11 sends an engine stop permission signal to the engine operation control system 6 as shown in FIG. 1. As a result, the engine operation control system 6 executes an engine stop request in response to the engine operation condition being no longer satisfied. As a result, the operation of the engine 4 is stopped.

It should be further noted that as long as the processing determines in step S16 that the engine operation condition is satisfied (i.e., that the engine 4 is running), the warning sound controller 11 proceeds to step S26 instead of step S17 as discussed above. In step S26, the processing determines if the current control cycle is the first cycle executed since the engine operation condition came to be satisfied (i.e., since the engine 4 started running). If it is the first cycle, then the processing performed by the warning sound controller 11 proceeds to step S27. In step S27, the engine-on timer TENGON is set to 0 before proceeding to step S28. However, if it is not the first cycle, then the processing performed by the warning sound controller 11 skips step S27 and proceeds directly to step S28.

In step S28, the warning sound controller 11 determines if the engine-on timer TENGON (which was reset to 0 in step S27) is smaller than a prescribed value ΔTON. Initially, the value of TENGON is smaller than the prescribed value ΔTON because the value is 0 (TENGON=0), and the warning sound controller 11 proceeds to step S29.

In step S29, the warning sound controller 11 increases the engine-on timer TENGON incrementally in, for example, a step-like fashion or in any other suitable manner. Thus, the engine-on timer TENGON serves to measure the amount of time that has elapsed since the engine operation condition was determined to be satisfied (i.e., since the engine 4 started operating). The processing then continues to step S22. In step S22, the warning sound controller 11 turns the vehicle exterior speaker 2 on to emit a warning sound as discussed above.

On the contrary, if the processing determines in step S28 that the value of the engine-on timer TENGON is equal or larger than the prescribed value ΔTON, the processing thus determines that the prescribed amount of time ΔTON has elapsed since the engine operation condition became satisfied (i.e., since the engine 4 started operating). Accordingly, the processing performed by the warning sound controller 11 proceeds to step S13. As discussed above, in step S13 the warning sound controller 11 sets the engine-on timer TENGON to an upper limit value. As further discussed above, in step S14 the warning sound controller 11 turns the vehicle exterior speaker 2 off so that a warning sound is not emitted.

The on-off control of the vehicle exterior speaker 2 (warning sound) according to FIG. 2 will now be further explained with reference to the operation time charts shown in FIG. 4. It should be noted that sections (a) and (b) of FIG. 4 correspond to accelerating from a stopped condition and decelerating to a stop, respectively, in a manner similar to sections (a) and (b) of FIG. 3 as discussed above.

Figure 4:
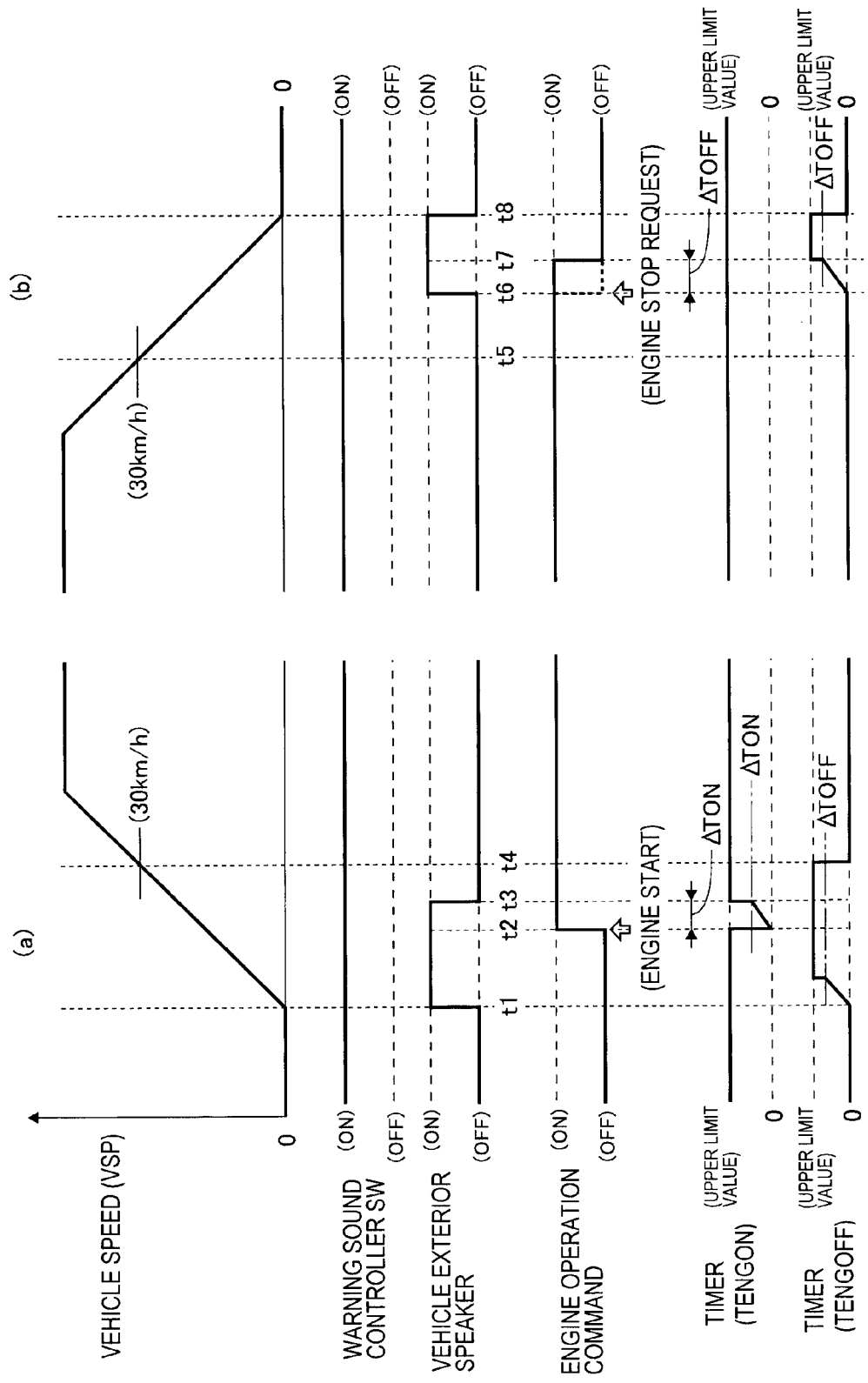
FIG. 4 is an exemplary operation time chart for the warning sound control program shown in FIG. 2, with section (a) of the time chart corresponding to a situation in which the vehicle is accelerated from a stopped state in a manner that involves the engine being started, and section (b) of the time chart corresponding to a situation in which the vehicle is decelerated to a stop in a manner that involves the engine being stopped.

At time t1 in FIG. 4, preparation for acceleration from a stopped condition is complete for the vehicle 3. The warning sound controller 11 thus performs operations of the control program shown in FIG. 2 that include steps S11, S15, S16, S17, S20, S21 and S22 as discussed above. By executing step S22, the warning sound controller 11 turns the vehicle exterior speaker 2 so that a warning sound is emitted.

With the warning sound, vehicle information can be conveyed to a person in a surrounding area outside of the vehicle 3 even if the engine operating sound is not being emitted because, for example, the engine 4 is stopped. Also, since the value of the engine-off timer TENGOFF is reset to 0 in step S12 until the time t1 is reached (e.g., until the vehicle speed becomes greater than 0 km/h), the incrementing of the engine-off timer TENGOFF executed in step S21 measures the time that has elapsed since the time t1, as shown in the bottommost plot of FIG. 4. However, the engine-off timer TENGOFF is not used at the time of acceleration from a stopped condition, which is before section (a) that begins at time t1 in FIG. 4.

At the time t2 in FIG. 4, the engine operation condition is satisfied due to the accelerator pedal being depressed deeply. Hence, the engine operation control system 6 shown in FIG. 1 starts the engine 4 immediately or almost immediately by issuing the engine operation command shown at time t2 in FIG. 4. Thus, since the engine 4 is started immediately or almost immediately when the engine operation condition is satisfied at time t2, a request for energy from the engine 4 can be satisfied promptly. This can be advantageous from the standpoint of energy response.

At time t2 when the engine operation condition is satisfied, the warning sound controller 11 initially performs operations of the control program shown in FIG. 2 that include steps S11, S15, S16, S26, S27, S28, S29 and S22. Starting from the second cycle afterward, the warning sound controller 11 performs operations of the control program shown in FIG. 2 that include steps S11, S15, S16, S26, S28, S29 and S22.

That is, starting from the engine start time t2 of FIG. 4, the warning sound controller 11 keeps the vehicle exterior speaker 2 on and continues emitting the warning sound by executing step S22. During this period, the engine-on timer TENGON (which was reset to 0 in step S27 during the initial cycle) is incremented in step S29 starting from the second cycle. Accordingly, the engine-on timer TENGON measures the time that has elapsed since the engine start time t2 as shown in FIG. 4.

At time t3, the engine-on timer TENGON reaches the prescribed value ΔTON, thus indicating that the time that has elapsed since the engine start time t2 reaches a prescribed amount of time ΔTON. In this event, the warning sound controller 11 processing proceeds from step S28 to step S13, and begins performing operations of the control program shown in FIG. 2 that includes steps S11, S15, S16, S26, S28, S13 and S14.

That is, at the time t3, the warning sound controller 11 sets the engine-on timer TENGON to the upper limit value as shown in FIG. 4 by executing step S13. The warning sound controller 11 also turns off the vehicle exterior speaker 2 to stop emitting the warning sound by executing step S14. However, even though the vehicle exterior speaker 2 is turned off so that a warning sound is not emitted, the engine 4 emits an operating sound. Therefore, a person in a surrounding area outside the vehicle 3 can obtain vehicle information from the engine operating sound, which acts as a warning sound.

At time t4 shown in FIG. 4, which is the end of section (a), the vehicle speed VSP reaches 30 km/h. When this occurs, the warning sound controller 11 performs operations of the control program shown in FIG. 2 that include the steps S11, S15, S12, S13 and S14. The warning sound controller 11 resets the engine-off timer TENGOFF to 0 as shown in FIG. 4 by executing step S12. The warning sound controller 11 also keeps the vehicle exterior speaker 2 off so that a warning sound is not emitted from the vehicle exterior speaker 2 by executing step S14.

As can be appreciated from the above, with the on-off control of the vehicle exterior speaker 2 (warning sound) shown in FIG. 2, the vehicle exterior speaker 2 is kept on so that a warning sound continues to be emitted during a period from the engine start time t2 until the time t3 when the prescribed time ΔTON has elapsed since the time t2, as shown in FIG. 4. Thus, even if the engine starts and emits an engine sound, the warning sound continues to be emitted such that both the engine sound and the warning sound are emitted for the duration of the prescribed amount of time ΔTON. Accordingly, the warning sound controller 11 is configured to control the vehicle exterior speaker 2 (warning sound emitting component) to emit the warning sound during a prescribed period that an engine sound is being emitted from the engine 4 of the vehicle 3 such that the engine sound and the warning sound are audible at a location outside the vehicle 3 during the prescribed period (e.g., between times t2 and t3) when the controller 11 is controlling the warning sound emitting component to switch between emitting the warning sound and refraining from emitting the warning sound based on a vehicle traveling condition.

Consequently, abrupt switching from the warning sound to the engine sound can be avoided in a reliable fashion. As a result, movement of the vehicle 3 as indicated by the warning sound matches or substantially matches movement of the vehicle 3 as indicated by the subsequently emitted engine sound. Hence, a person in a surrounding area outside the vehicle 3 can obtain vehicle information in an uninterrupted manner without experiencing a feeling that something is unusual about the sound of the vehicle.

Also, a silent period in which neither the engine sound nor the warning sound is emitted can be reliably avoided. As a result, it is possible to avoid or at least reduce the occurrence of a situation in which a person in a surrounding area outside the vehicle 3 cannot easily understand the vehicle information due to the occurrence of such a silent period, and inadvertently believes that the vehicle 3 has temporarily moved farther away At time t5 shown in FIG. 4, the vehicle speed VSP decreases below 30 km/h due to deceleration. This begins section (b) of FIG. 4. Hence, at time t5, the warning sound controller 11 switches from performing operations of the control program shown in FIG. 2 that include the steps S11, S12, S13 and S14 discussed previously, to performing operations that include the steps S11, S15, S16, S26, S28, S13 and S14. By continuing to execute step S14, the warning sound controller 11 keeps the vehicle exterior speaker 2 off so that a warning sound is not emitted from the vehicle exterior speaker 2. However, vehicle information can be conveyed to a person in a surrounding area outside the vehicle 3 because the engine operation control system 6 shown in FIG. 1 is still operating the engine 4 with the engine operation command as shown in FIG. 4.

At time t6 shown in FIG. 4, the accelerator pedal is released from a deeply depressed state. Thus, the engine operation condition is no longer satisfied. The engine operation control system 6 shown in FIG. 1 immediately or almost immediately issues an engine stop request to turn the engine operation command off as indicated by a broken line in FIG. 4. As a result, the warning sound controller 11 initially performs operations including steps S11, S15, S16, S17, S18, S19, S20, S21 and S22 of the control program shown in FIG. 2. Starting from the second cycle afterwards, the warning sound controller 11 performs operations including steps S11, S15, S16, S17, S20, S21 and S22.

Starting from the time t6 of FIG. 4, when the engine stop request is issued, the vehicle exterior speaker 2 is turned on and a warning sound is emitted due to the execution of step S22. During this period, the engine stop permission flag is initially reset to 0 in step S18, and the reset state continues even afterward. Consequently, the warning sound controller 11 shown in FIG. 1 does not send the engine stop permission signal to the engine operation control system 6. As a result, the engine operation control system 6 does not execute the engine stop request by turning the engine operation command off at the time t6 as indicated with the broken line in FIG. 4. Instead, the engine operation control system 6 keeps the engine operation command on as indicated with a solid line so that the engine 4 continues to run.

In the first control cycle after the engine stop request time t6 of FIG. 4 is reached, the engine-off timer TENGOFF is reset to 0 in step S19. Then, starting from the second cycle, the value of the engine-off timer TENGOFF is incremented in step S21. Thus, the engine-off timer TENGOFF measures the amount of time that has elapsed since the engine stop request time t6 occurred as shown in FIG. 4.

At time t7, the engine-off timer TENGOFF reaches the prescribed value ΔTOFF. When the time that has elapsed since the engine stop request time t6 reaches a prescribed amount of time ΔTOFF, the warning sound controller 11 proceeds from step S20 to step S23. The warning sound controller 11 then begins performing operations of the control program shown in FIG. 2 that includes steps S11, S15, S16, S17, S20, S23, S24, and S22.

At the time t7, the warning sound controller 11 sets the engine stop permission flag to 1 by executing step S23, and sends an engine stop permission signal to the engine operation control system 6. As a result, at the time t7 of FIG. 4, the engine operation control system 6 turns off the engine operation command as indicated with the solid line, and executes the engine stop request. Thus, the engine operation control system 6 waits until the time t7 before stopping the operation of the engine 4 in response to the stop request issued at the time t6.

Even after the engine 4 is stopped at time t7, the vehicle exterior speaker 2 stays on as continuing from the time t6 to emit a warning sound. Thus, a person in a surrounding area outside the vehicle 3 can obtain vehicle information from the warning sound. At time t7, the warning sound controller 11 sets the engine-off timer TENGOFF to the upper limit value as indicated in FIG. 4 by executing step S24. In the example illustrated in FIG. 4, the engine-on timer TENGON does not change after being set to an upper limit value in step S13. The engine-on timer TENGON thus remains at the upper limit value as indicated in FIG. 4.

At time t8, which is the end of section (b) in FIG. 4, the vehicle speed VSP reaches 0 km/h. Accordingly, the warning sound controller 11 begins performing operations of the control program shown in FIG. 2 that includes the steps S11, S15, S12, S13 and S14. The warning sound controller 11 resets the engine-off timer TENGOFF to 0 as shown in FIG. 4 by executing step S12. The warning sound controller 11 also turns the vehicle exterior speaker 2 off by executing step S14 so that a warning sound is no longer emitted by the vehicle exterior speaker 2.

As can be appreciated from the above, with the on-off control of the vehicle exterior speaker 2 (warning sound) shown in FIG. 2, the vehicle exterior speaker 2 is turned on immediately or almost immediately at an engine stop request time t6 so that a warning sound is emitted. Meanwhile, execution of the engine stop request is delayed and the engine 4 continues running from the engine stop request time t6 until time t7 when a prescribed amount of time ΔTOFF has elapsed. Thus, even after the vehicle exterior speaker 2 is turned ON and the warning sound is emitted, engine 4 continues running such that both the engine sound and the warning sound are emitted for the duration of the prescribed amount of time ΔTOFF.

Consequently, an abrupt switch from the engine sound to the warning sound can be avoided in a reliable fashion. As a result, a movement of the vehicle 3 indicated by the engine sound matches a movement of the vehicle 3 indicated by the subsequently emitted warning sound. Therefore, a person in a surrounding area outside the vehicle 3 can obtain vehicle information in an uninterrupted manner without experiencing a feeling that something is unusual about the sound of the vehicle 3.

Also, a silent period in which neither the engine sound nor the warning sound is emitted can be reliably avoided. As a result, it is possible to prevent or at least reduce an occurrence of a situation in which a person in a surrounding area outside the vehicle cannot easily understand the vehicle information due to the occurrence of such a silent period and inadvertently believes that the vehicle 3 has temporarily moved farther away.

Further details will now be described pertaining to the prescribed amount of time ΔTON used to delay turning the vehicle exterior speaker 2 from on to off, and the prescribed amount of time ΔTOFF used to delay stopping the engine as discussed above.

Figure 5A:
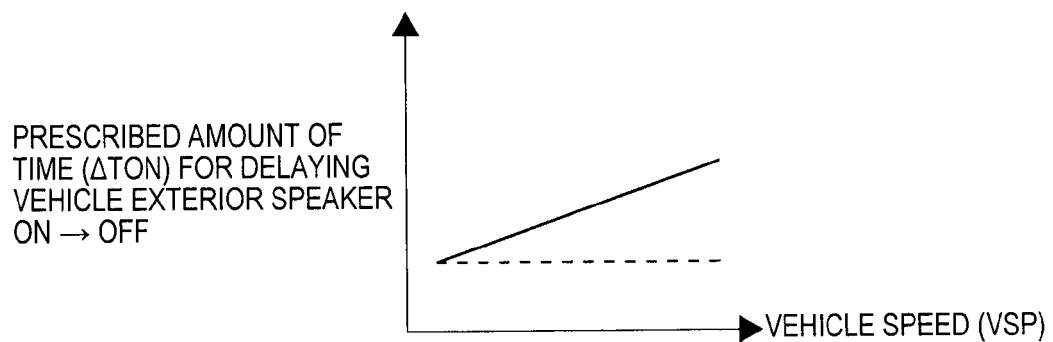
FIG. 5A is a characteristic diagram indicating an example of how a prescribed amount of time during which an on-to-off transition of the vehicle exterior speaker shown in FIG. 2 is delayed is varied.

In order to achieve the operational effect illustrated in FIG. 4, the vehicle exterior speaker 2 remains on and continues to emit the warning sound for a period of time after the engine 4 is started at the time t2 shown in FIG. 4. In other words, the vehicle exterior speaker 2 remains on until a person in a surrounding area outside the vehicle 3 can recognize the engine sound. The prescribed amount of time ΔTON is used to delay the switch of the vehicle exterior speaker 2 from an on state to an off state for the aforementioned period of time. Thus, the prescribed amount of time ΔTON used for delaying the on-to-off transition of the vehicle exterior speaker 2 can be set to a constant value that does not depend on the vehicle speed VSP, as indicated with a broken line in FIG. 5A, for example.

However, the amount of time required for a person in a surrounding area outside the vehicle to recognize the engine sound after the engine 4 is started at the time t2 shown in FIG. 4 tends to be longer when the vehicle speed VSP (i.e., the speed of the vehicle 3 relative to the ground) is higher. Thus, it is preferable to set the prescribed amount of time ΔTON used to delay the on-to-off transition of the vehicle exterior speaker 2 such that the amount of time lengthens as the vehicle speed VSP increases, as indicated with a solid line in FIG. 5A.

Figure 5B:
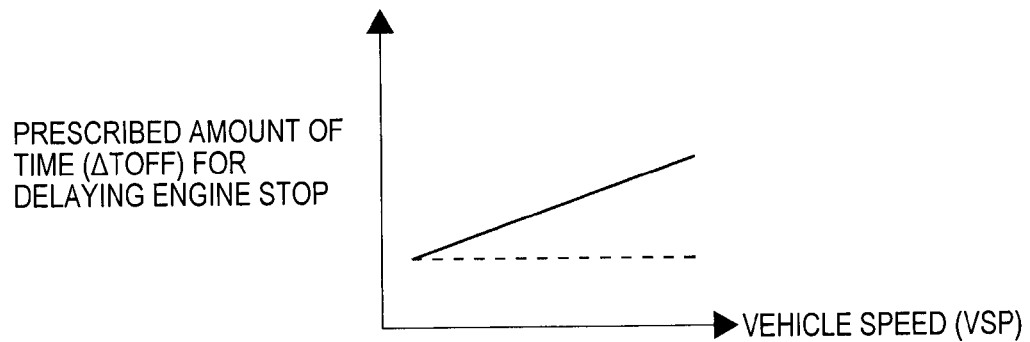
FIG. 5B is a characteristic diagram indicating an example of how a prescribed amount of time during which an engine stoppage is delayed is varied.

In addition, to achieve the operational effect illustrated in FIG. 4, the engine 4 keeps running and execution of an engine stop request is delayed for a period of time after the vehicle exterior speaker 2 is turned on at the time t6 shown in FIG. 4. That is, the engine 4 keeps running until a person in a surrounding area outside the vehicle 3 can recognize the engine sound. The prescribed amount of time ΔTOFF is used to delay execution of the engine stop for the aforementioned period of time. Thus, the prescribed amount of time ΔTOFF used for delaying the engine stop can be set to a constant value that does not depend on the vehicle speed VSP, as indicated with a broken line in FIG. 5B, for example.

However, the amount of time required for a person in a surrounding area outside the vehicle 3 to recognize the warning sound after vehicle exterior speaker 2 is turned on at the time t6 shown in FIG. 4 tends to be longer when the vehicle speed VSP (i.e., the speed of the vehicle 3 relative to the ground) is higher. Thus, it is preferable to set the prescribed amount of time ΔTOFF used to delay the engine stop such that the amount of time lengthens as the vehicle speed VSP increases, as indicated with a solid line in FIG. 5B.

Figure 6:
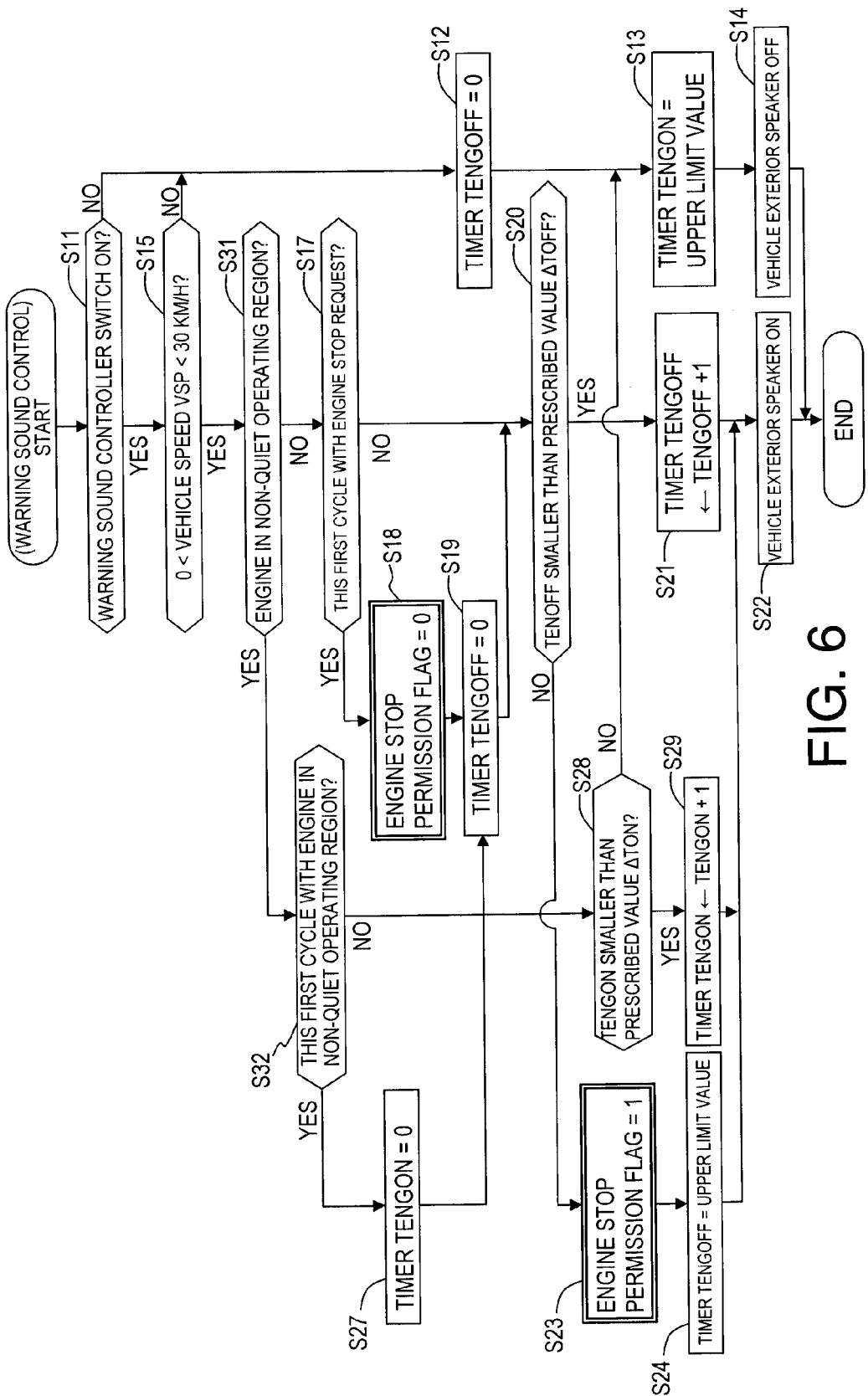
FIG. 6 is similar to FIG. 2 and shows a flowchart of an example of warning sound control program executed by a vehicle warning sound emitting apparatus according to another embodiment.

FIG. 6 illustrates an example of a warning control program executed by a vehicle warning sound emitting apparatus 1 according to another disclosed embodiment. In this embodiment, the warning sound emitting apparatus 1 is the same as that shown in FIG. 1. Also, the warning sound controller 11 shown in FIG. 1 executes the control program shown in FIG.

6 repeatedly once every prescribed time period, for example, every 10 msec or any other suitable period, with a regular interrupt. The program serves to emit a warning to convey vehicle information to a person existing in a surrounding area outside the vehicle 3.

The control program shown in FIG. 6 is basically the same as the control program shown in FIG. 2, except that steps S16 and S26 are replaced with steps S31 and S32, respectively. Hence, to avoid redundancy, explanations of the steps that achieve the functions as discussed above with regard to FIG. 2 are omitted.

In the embodiment discussed with regard to FIG. 2, it is assumed that a person in a surrounding area outside the vehicle 3 can hear the engine sound and obtain vehicle information from the engine sound as long as the engine 4 is running, even if the engine 4 is operating in a quietest operating region. Thus, as long as the warning sound controller 11 determines in step S16 of FIG. 2 that an engine operation condition is satisfied (i.e., the engine 4 is running), step S26 is performed to determine if the current cycle is the first cycle since the engine operation condition came to be satisfied (i.e., since the engine 4 started running). Thereafter, steps S27, S28, S29 and S22 are performed to the operational effect shown in FIG. 4.

However, the engines of some vehicles are extremely quiet. Accordingly, a person in a surrounding region outside the vehicle 3 may have some difficulty hearing the engine 4 when the engine 4 is operating in a quiet operating mode. Thus, a person in a surrounding region outside the vehicle 3 may have some difficulty in obtaining vehicle information from the engine sound unless the vehicle 3 is traveling at a speed that is somewhat high or with a load that is somewhat large. Therefore, in this embodiment, the warning sound controller 11 executes step S31 of FIG. 6 to determine if the engine 4 is operating in a non-quiet operating mode (i.e., if the vehicle 3 is traveling in a non-quiet fashion). In a non-quiet operating mode, a person in a surrounding area outside the vehicle 3 can hear the engine sound and obtain vehicle information from the engine sound. While the engine 4 is determined to be operating in a non-quiet operating region (i.e., the vehicle is traveling in a non-quiet fashion), the warning sound controller 11 determines in step S32 if the current cycle is the first cycle in which the engine 4 was determined to be operating in a non-quiet operating mode (i.e., the vehicle was determined to be traveling in a non-quiet fashion). If a determination is made in step S32 that the engine 4 is operating in a non-quiet operating mode, the warning sound controller 11 performs steps S27, S28, S29 and S22 to achieve the operational effects shown in FIG. 4 in the same or substantially the same manner as the embodiment discussed above with regard to FIG. 2.

Accordingly, the warning sound controller 11 is further configured to receive a request for the transition between the non-quiet vehicle traveling condition to the quiet vehicle traveling condition. In response to the request, the warning sound controller 11 controls the vehicle exterior speaker 2 (warning sound emitting component) to emit the warning sound when the request was received and delays the transition from the non-quiet vehicle traveling condition to the quiet vehicle traveling condition by the prescribed period from a time that the warning sound controller 11 receives the transition request. The vehicle traveling condition can indicate a transition between a quiet vehicle traveling condition and a non-quiet vehicle traveling condition. Thus, the warning sound controller 11 is further configured to delay, for the prescribed period that begins at the time of the transition, the switching of the vehicle exterior speaker 2 (warning sound emitting component) from emitting the warning sound to refraining from emitting the warning sound. The prescribed period (e.g., between can correspond to an amount of time for a person at the location outside the vehicle 3 to recognize that the engine sound is emitted subsequent to the emitting of the warning sound or vice-versa. Moreover, the prescribed period (e.g., $\Delta$TON between time t2 and t3) increases in accordance with an increase in a speed of the vehicle 3 with respect to a ground.

With a vehicle warning sound emitting apparatus according to the embodiment shown in FIG. 6, the same operational effects can be obtained as with the embodiment shown in FIG. 2 even when the engine sound is extremely small and may not be readily be heard by a person in a surrounding region outside the vehicle 3 when the engine 4 is operating in a quiet operating mode. That is, the same operations effects can be obtained even if a person in a surrounding region outside the vehicle 3 may not be able to readily obtain vehicle information from the engine sound unless the vehicle 3 is traveling at a speed that is somewhat high or with a load that is somewhat large.

As can be appreciated from the above, the embodiments described herein enable a vehicle 3 to emit a warning sound oriented toward an area outside of the vehicle 3 to convey vehicle information. The vehicle information can indicate, for example, the existence of the vehicle 3, a shift operation, an accelerator operation, a brake operation, or another operation indicating an intent of a driver. The vehicle information can also indicate a traveling direction of the vehicle 3, the vehicle speed, or another vehicle traveling condition.

In summary, as shown in FIG. 4, when the vehicle 3 accelerates into motion from a stop, the vehicle exterior speaker 2 is turned on and a warning sound is emitted at time t1 when an acceleration preparation of the vehicle 3 is completed. At time t2, the engine 4 starts and the warning sound becomes unnecessary. Nevertheless, the vehicle external speaker 2 remains on and the warning sound emission is allowed to continue until a time t3 that occurs when a prescribed amount of time $\Delta$TON has elapsed, which corresponds to when the sound of the started engine can becomes audible. When the vehicle 3 is decelerated to a stop while the engine 4 is running, the vehicle exterior speaker 2 is turned on at time t6 to emit a warning sound when an engine stop request is issued. Although the engine stop request could be executed at time t6 when the warning sound starts, execution of the engine stop request is delayed until time t7 when a prescribed amount of time $\Delta$TOFF has elapsed and the warning sound emitted from vehicle exterior speaker 2 has become audible.

Thus, the warning sound emitting apparatus 1 can be used in a vehicle 3 that includes an engine 4, such as a combustion engine, and an electric motor 5 to propel the vehicle 3. The warning sound emitting apparatus 1 can emit a warning sound when the vehicle 3 is traveling quietly while the engine 4 is not emitting an engine sound or the engine sound is too small to serve as a warning. Moreover, the warning sound emitting apparatus 1 sets an overlap period which ensures that both the engine sound and the warning sound can be heard during a prescribed period when the warning sound emitting apparatus 1 is switching between emitting the warning sound and silencing the warning sound regardless of whether or not the vehicle is traveling quietly.

Furthermore, when the warning sound is switched from an emitted state to a silenced state in response to a transition from a quiet traveling state to a non-quiet traveling state of the vehicle 3, the engine sound and the warning sound can be heard during a prescribed period starting from the time of the switching. Also, when the warning sound is switched from a silenced state to an emitted state in response to a transition from a non-quiet traveling state to a quiet traveling state, both the engine sound and the warning sound can be heard during a prescribed period starting from the time of the switching. Consequently, the switch between the engine sound and the warning sound does not occur too abruptly, which enables a person to more readily hear and understand the vehicle information, such as the vehicle position, traveling direction, traveling speed and so on, that is conveyed by the engine sound and the warning sound.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle warning sound emitting apparatus. Accordingly, these terms, as utilized to describe the present invention should be interpreted relative to a vehicle equipped with the vehicle warning sound emitting apparatus. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle warning sound emitting apparatus comprising:
    a warning sound emitting component configured to selectively emit a warning sound that is audible outside of the vehicle; and
    a controller configured to control the warning sound emitting component to emit the warning sound when the vehicle begins moving and to continue emitting the warning sound during a prescribed period that begins based on a starting of an engine of the vehicle which causes an engine sound to be emitted from the engine of the vehicle such that the engine sound and the warning sound are audible at a location outside the vehicle during the prescribed period, and the controller being further configured to commence controlling the warning sound emitting component to cease emitting the warning sound when the prescribed period has elapsed while the engine is emitting the engine sound and before the vehicle has reached a prescribed speed,
    the prescribed period being set to increase in accordance with an increase in a speed of the vehicle with respect to a ground.

2. The vehicle warning sound emitting apparatus recited in claim 1, wherein
    the controller is further configured to receive a request for stopping the engine after the vehicle has slowed to below the prescribed speed and, in response to the request, the controller controls the warning sound emitting component to emit the warning sound when the request was received and before the engine is stopped, and to continue emitting the warning sound after the engine is stopped.

3. The vehicle warning sound emitting apparatus recited in claim 1, wherein
    the prescribed period corresponds to an amount of time for a person at the location outside the vehicle to recognize that the engine sound is emitted subsequent to the emitting of the warning sound or vice-versa.

4. The vehicle warning sound emitting apparatus recited in claim 1, wherein
    the controller is configured to control the warning sound emitting component to continue emitting the warning sound after the engine is stopped until the vehicle stops moving.

5. The vehicle warning sound emitting apparatus recited in claim 2, wherein
    the prescribed period corresponds to an amount of time for a person at the location outside the vehicle to recognize that the engine sound is emitted subsequent to the emitting of the warning sound or vice-versa.

6. The vehicle warning sound emitting apparatus recited in claim 2, wherein
    the controller is configured to control the warning sound emitting component to continue emitting the warning sound after the engine is stopped until the vehicle stops moving.

7. The vehicle warning sound emitting apparatus recited in claim 3, wherein
    the controller is configured to control the warning sound emitting component to continue emitting the warning sound after the engine is stopped until the vehicle stops moving.

8. The vehicle warning sound emitting apparatus recited in claim 5, wherein
    the controller is configured to control the warning sound emitting component to continue emitting the warning sound after the engine is stopped until the vehicle stops moving.

* * * * *